US008894267B2

(12) United States Patent
Huang et al.

(10) Patent No.: US 8,894,267 B2
(45) Date of Patent: Nov. 25, 2014

(54) PANEL DISPLAY DEVICE, BACK FRAME AND MANUFACTURING OF BACK FRAME

(75) Inventors: Chong Huang, Guandong (CN); Yu-chun Hsiao, Guandong (CN); Yi-cheng Kuo, Guandong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 87 days.

(21) Appl. No.: 13/582,745

(22) PCT Filed: Aug. 3, 2012

(86) PCT No.: PCT/CN2012/079626
§ 371 (c)(1),
(2), (4) Date: Sep. 5, 2012

(87) PCT Pub. No.: WO2014/015534
PCT Pub. Date: Jan. 30, 2014

(65) Prior Publication Data

US 2014/0029241 A1 Jan. 30, 2014

(30) Foreign Application Priority Data

Jul. 24, 2012 (CN) .......................... 2012 1 0257808

(51) Int. Cl.
*F16M 13/00* (2006.01)
*G09F 13/04* (2006.01)
*B23P 11/00* (2006.01)

(52) U.S. Cl.
USPC ......... 362/633; 362/634; 362/97.1; 362/97.2; 349/58

(58) Field of Classification Search
CPC .................. G02F 2001/133314; G02F 1/1333; G02F 1/133608; B23K 2201/24
USPC .................. 362/97.1–97.2, 633–634; 349/58; 361/807, 810; 29/897.31, 897.312; 348/373, 825; 40/549
See application file for complete search history.

(56) References Cited

U.S. PATENT DOCUMENTS

| | | | | |
|---|---|---|---|---|
| 7,371,002 | B2 * | 5/2008 | Wang et al. | 362/633 |
| 2007/0114267 | A1 * | 5/2007 | Hsu | 228/155 |
| 2010/0045888 | A1 * | 2/2010 | Naritomi | 349/58 |
| 2011/0102709 | A1 * | 5/2011 | Lan et al. | 349/64 |
| 2011/0149191 | A1 * | 6/2011 | Chen et al. | 349/58 |

* cited by examiner

*Primary Examiner* — Diane Lee
*Assistant Examiner* — Naomi M Wolford
(74) *Attorney, Agent, or Firm* — Andrew C. Cheng

(57) ABSTRACT

The present invention provides a panel display device, back frame and manufacturing method for back frame. The back frame includes at least two main splicing elements forming back frame, the at least two main splicing elements including main splicing element for disposing light source, wherein light source is disposed on a surface of side wall of main splicing element bended upward for light source disposition, downward hooks are disposed on the other surface of side wall away from light source, main splicing element with light source has a first heat-dissipation capability, and remaining main splicing elements of the at least two main splicing elements without light source have a second heat-dissipation capability, first heat-dissipation capability is better than second heat-dissipation capability. As such, the present invention can reduce material and mold costs as well as better heat-dissipation and easy assembling of front frame and panel.

11 Claims, 12 Drawing Sheets

23

PANEL DISPLAY DEVICE, BACK FRAME AND MANUFACTURING OF BACK FRAME

BACKGROUND OF THE INVENTION

1. Field of the Invention

The present invention relates to the field of displaying techniques, and in particular to a panel display device, back frame and manufacturing method of back frame thereof.

2. The Related Arts

The liquid crystal display device of known technique usually comprises a front frame, a panel and a backlight module, and the backlight module comprises a back frame, a reflector, a light-guiding plate and a light set.

At present, display panels of different sizes are available in the market for different needs. For example, in the TV market, the common sizes for liquid crystal panel are 31.5, 42, 46, 48 and 55 inches. Different back molds are required for liquid crystal panels of different sizes.

Referring to FIG. 1, FIG. 1 is a schematic view showing the structure of a back frame of liquid crystal display device of known technique. As shown in FIG. 1, a back frame 10 of known technique is usually made of a monolithic structure, manufactured by metal stamping or plastic inject molding techniques so that back frame 10 consumes more material and results in high material cost. In addition, a large-sized back frame 10 usually requires larger stamping equipments and larger molds with complex structure, thus, a higher cost.

SUMMARY OF THE INVENTION

The technical issue to be addressed by the present invention is to provide a panel display device, back frame and manufacturing of back frame thereof, to reduce material cost and mold cost as well as enabling heat-dissipation and easy assembly front frame and panel.

The present invention provides a manufacturing method for back frame of panel display device, which comprises: manufacturing at least a first main splicing element and a second main splicing element, surface on one end of the first main splicing element being disposed with two splicing parts laid out along length direction of the first main splicing element with separating space, and the splicing parts of the first main splicing element matching one end of the second main splicing element; wherein at least one of the first or the second main splicing element being disposed with a light source and the material for the main splicing element disposed with the light source being aluminum extrusion; wherein the main splicing element made of aluminum extrusion comprising a side wall bended upwards and a reverse L-shaped for-processing block formed by extending from another surface of the side wall away from the light source, milling off an inner part of the reverse L-shaped for-processing block near lower end to form the main splicing element having a hook to be disposed with the light source, the light source being disposed on a surface of the side wall bended upward for light source disposition, one or more remaining main splicing elements not for disposing light source being made of galvanized steel; and the first main splicing element splicing with the second main splicing element through the splicing parts to form a main frame of the back frame.

According to a preferred embodiment of the present invention, two hooks are formed, referred to as a first hook and a second hook, respectively; wherein the first hook is for matching an engaging structure of a front frame so as to the fasten front frame to the back frame, and the second hook is for matching an engaging structure of a panel so as to fasten the panel to the back frame.

The present invention provides a back frame of panel display device, which comprises: at least two main splicing elements, forming a main frame of the back frame; wherein at least a main splicing element bended upwards for disposing with a light source; the at least two main splicing elements comprising the main splicing element for disposing the light source; wherein the light source being disposed on a surface of a side wall of the main splicing element bended upward for light source disposition; and at least a downward hook being disposed on the other surface of the side wall away from the light source, the main splicing element for disposing the light source having a first heat-dissipation capability; one or more remaining main splicing elements of the at least two main splicing elements not for disposing the light source having a second heat-dissipation capability; the first heat-dissipation capability being greater than the second heat-dissipation capability.

According to a preferred embodiment of the present invention, the main splicing element for disposing the light source is made of aluminum extrusion, the remaining main splicing element is made of galvanized steel, and the downward hook of aluminum extrusion is milled out by reverse L-shaped aluminum extrusion.

According to a preferred embodiment of the present invention, the at least two main splicing elements comprises a first main splicing element and a second main splicing element, spliced together; wherein a surface on one end of the first main splicing element is disposed with two splicing parts laid out along length direction of the first main splicing element with separating space, and first main splicing element splices with the second main splicing element through splicing parts to form the main frame of the back frame of different sizes.

According to a preferred embodiment of the present invention, the splicing part is a concave part disposed on a surface of the first main splicing element, a surface on one end of the second main splicing element is disposed with convex parts laid out along length direction of the second main splicing element with separating space; the convex part inserts into the concave part to splice the first main splicing element with the second main splicing element.

According to a preferred embodiment of the present invention, a bottom of the concave part of first main splicing element is disposed with a first via hole, a corresponding location on second main splicing element is disposed with a second via hole, the back frame comprises a fixing element, and the fixing element passes through the first via hole and the second via hole to splice the first main splicing element with the second main splicing element.

According to a preferred embodiment of the present invention, the back frame comprises a third main splicing element and a fourth main splicing element; the first main splicing element, the second main splicing element, the third main splicing element and the fourth main splicing element all have a long strip shape, and are spliced in a head-to-tail manner to form the main frame of the back frame.

According to a preferred embodiment of the present invention, the back frame comprises auxiliary splicing elements disposed inside the main frame, and the auxiliary splicing elements are spliced with the main splicing elements.

According to a preferred embodiment of the present invention, the auxiliary splicing elements comprise a first auxiliary splicing element and a second auxiliary splicing element; two ends of the first auxiliary splicing element are spliced with at least two of the first main splicing element, the second main splicing element, the third main splicing element and the fourth main splicing element; and two ends of the second auxiliary splicing element are spliced with at least two of the first main splicing element, the second main splicing element, the third main splicing element and the fourth main splicing element.

According to a preferred embodiment of the present invention, two ends of first auxiliary splicing element are spliced with the adjacently disposed first main splicing element and second main splicing element, and two ends of second auxiliary splicing element are spliced with the adjacently disposed third main splicing element and fourth main splicing element; or, two ends of first auxiliary splicing element are spliced with the adjacently disposed third main splicing element and fourth main splicing element, and two ends of second auxiliary splicing element are spliced with the adjacently disposed first main splicing element and second main splicing element.

According to a preferred embodiment of the present invention, the second main splicing element, the fourth main splicing element, the first auxiliary splicing element and the second auxiliary splicing element are disposed in parallel.

According to a preferred embodiment of the present invention, the back frame comprises at least a support frame, detachably fixed to one or more of the first main splicing element, the second main splicing element, the third main splicing element, the fourth main splicing element, the first auxiliary splicing element and the second auxiliary splicing element, and the support frame is disposed with a bump.

The present invention provides a panel display device, which comprises: a front frame, a panel and a backlight system; the backlight system further comprises: a light source, a light uniformizing mechanism and a back frame; the back frame comprises: at least two main splicing elements, forming a main frame of the back frame; wherein at least a main splicing element bended upwards for disposing with a light source; the at least two main splicing elements comprising the main splicing element for disposing the light source; wherein the light source being disposed on a surface of a side wall of the main splicing element bended upward for light source disposition; and a downward hook being disposed on the other surface of the side wall away from the light source, the main splicing element for disposing the light source having a first heat-dissipation capability; one or more remaining main splicing element of the at least two main splicing elements not for disposing light source having a second heat-dissipation capability; the first heat-dissipation capability being greater than the second heat-dissipation capability; the back frame also carrying a light uniformizing mechanism, the panel being sandwiched between the front frame and back frame; the front frame being disposed with a downward extending side wall, the side wall of the front frame being disposed with a window matching the hook of the back frame; the hook of back frame passing through the window of the side wall of the front frame to fasten front frame.

According to a preferred embodiment of the present invention, the main splicing element for disposing a light source is made of aluminum extrusion, the remaining main splicing element is made of galvanized steel, and the downward hook of aluminum extrusion is milled out by reverse L-shaped aluminum extrusion.

The efficacy of the present invention is that to be distinguished from the state of the art. The back frame, manufacturing method for back frame and backlight system of the present invention, through disposing at least two main splicing elements, splices the at least two main splicing elements to simplify the structure for back frame molds to reduce back frame mold cost as well as save material for back frame to reduce manufacturing cost of panel display device. In addition, because of the skeleton structure of the back frame and the use of heat-dissipating material for main splicing element disposed with light source, the present invention is good for heat-dissipation. The other surface of side wall of main splicing element away from light source is disposed with hook to engage and fasten the front frame and the panel for easy assembly of front frame and panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following combines drawings and embodiments to describe the present invention in details.

Figure 1:
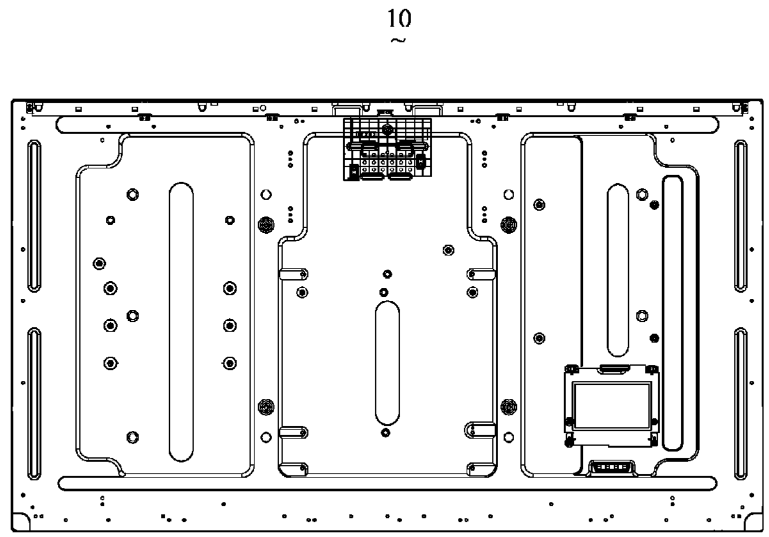
Figure 1 (PRIOR ART)
FIG. 1 is a schematic view showing the structure of a back frame of a liquid crystal display device in known technique.
Figure 2:
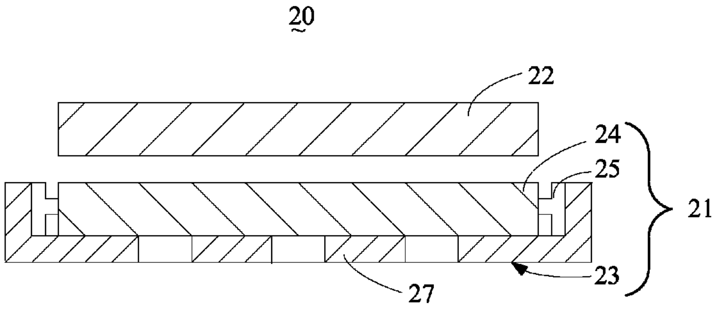
FIG. 2 is a schematic view showing the structure of the first embodiment of the panel display device according to the present invention.
Figure 3:
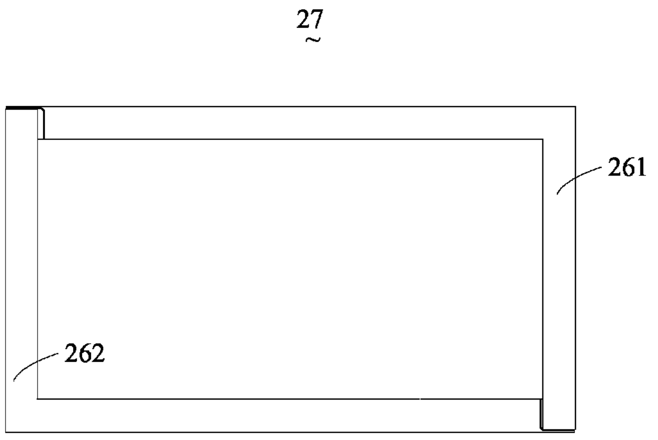
FIG. 3 is a schematic view showing the structure of the second embodiment of the panel display device according to the present invention.

Referring to FIGS. 2-3, FIG. 2 is a schematic view showing the structure of the first embodiment of the panel display device according to the present invention, and FIG. 3 is a schematic view showing the structure of the second embodiment of the panel display device according to the present invention. As shown in FIG. 2, a panel display device 20 of the present embodiment comprises: a backlight system 21 and a display panel 22. The backlight system 21 is disposed on the back of the display panel 22 and provides a light source to the display panel 22.

In the instant embodiment, the backlight system 21 comprises: a light source 25, a light-uniformizing mechanism 24 and a back frame 23, wherein the back frame carries the light source 25 and the light-uniformizing mechanism 24. When the backlight system 21 is edge-lit, the light-uniformizing mechanism 23 is a light-guiding plate; when the backlight system 21 is direct-lit, the light-uniformizing mechanism 23 is diffuser. The back frame 23 comprises at least a first main splicing element and a second main splicing element. The at least a first main splicing element and a second main splicing element form main frame 27 of the back frame 23.

Also refer to FIG. 3. The first embodiment of back frame 23 comprises: a first main splicing element 261 and a second main splicing element 262. One end of the first main splicing element 261 is spliced with one end of the second main splicing element 262, and the other end of the first main splicing element 261 is spliced with the other end of the second main splicing element 262 to form the main frame 27 of the back frame 23. Both the first main splicing element 261 and the second main splicing element 262 are made of aluminum or galvanized steel. In the present embodiment, both the first main splicing element 261 and the second main splicing element 262 are L-shaped.

Figure 4:
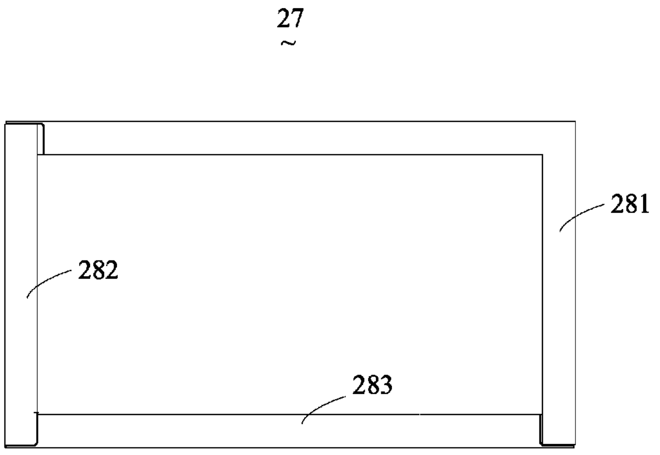
FIG. 4 is a schematic view showing the structure of the third embodiment of the panel display device according to the present invention.

Also refer to FIG. 4. The second embodiment of the back frame 23 comprises: a first main splicing element 281, a second main splicing element 282 and a third main splicing element 283. The first main splicing element 281, the second main splicing element 282 and the third main splicing element 283 are spliced to form the main frame 27 of the back frame 23. The first main splicing element 281, the second main splicing element 282 and the third main splicing element 283 are all made of aluminum or galvanized steel. In the present embodiment, the first main splicing element 281 is L-shaped, and both the second main splicing element 282 and the third main splicing element 283 have a long strip shape.

In addition, the back frame 23 can also comprises two auxiliary splicing elements disposed inside and spliced with the main frame 27.

The following uses four main splicing elements and two auxiliary splicing elements to describe the back frame 23 of the panel display device 20 of the present invention.

Figure 5:
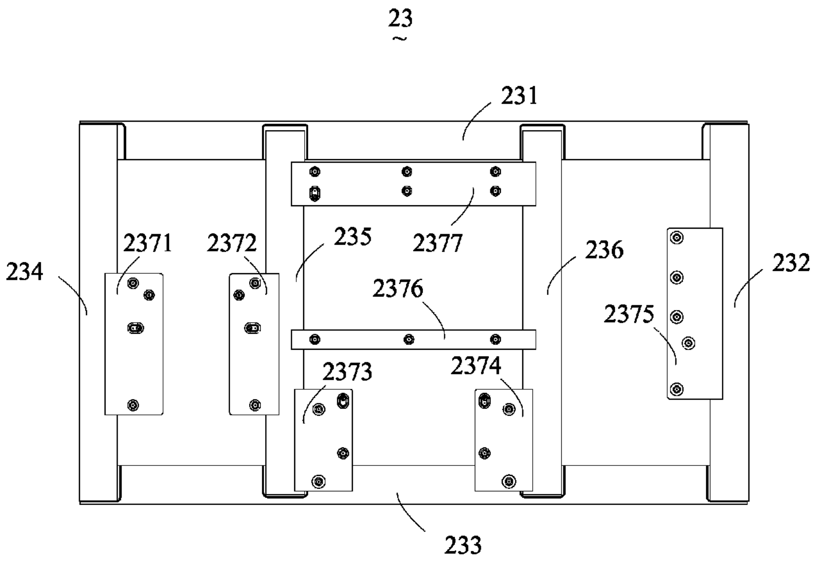
FIG. 5 is a schematic view showing the structure of the fourth embodiment of the panel display device according to the present invention.

Referring to FIG. 5, FIG. 5 is a schematic view showing the structure of the fourth embodiment of the panel display device according to the present invention. As shown in FIG. 5, in the instant embodiment, the back frame 23 comprises: a first main splicing element 231, a second main splicing element 232, a third main splicing element 233, a fourth main splicing element 234, a first auxiliary splicing element 235, a second auxiliary splicing element 236 and support frames 2371, 2372, 2373, 2374, 2375, 2376, 2377. The first main splicing element 231, the second main splicing element 232, the third main splicing element 233 and the fourth main splicing element 234 are spliced in a head-to-tail manner to from the main frame 27 of the back frame 23. The first auxiliary splicing element 235 and the second auxiliary splicing element 236 are auxiliary splicing elements, disposed inside the main frame 27 and spliced with the main frame 27.

Specifically, one end of the first main splicing element 231 is spliced to one end of the second main splicing element 232; the other end of the second main splicing element 232 is spliced to one end of the third main splicing element 233; the other end of the third main splicing element 233 is spliced to the fourth main splicing element 234; and the other end of the fourth main splicing element 234 is spliced to the other end of the first main splicing element 231. As such, a rectangular main frame 27 is formed; wherein the first main splicing element 231, the second main splicing element 232, the third main splicing element 233 and the fourth main splicing element 234 are all made of aluminum or galvanized steel. In the instant embodiment, the first main splicing element 231, the second main splicing element 232, the third main splicing element 233 and the fourth main splicing element 234 are all shaped as a long strip. In other embodiments, the first main splicing element 231, the second main splicing element 232, the third main splicing element 233 and the fourth main splicing element 234 can all be shaped as L-shape, or some as long strip and others as L-shape. For example, in FIG. 3, the first main splicing element 261 and the second main splicing element 262 are both shaped as L-shape; while in FIG. 4, the first main splicing element 281 is shaped as L-shape, and both the second main splicing element 282 and the third main splicing element 283 are shaped as long strip.

Figure 6:
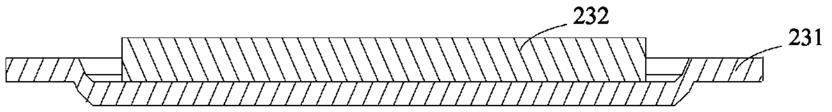
FIG. 6 is a schematic view showing the structure of the splicing manner of the fifth embodiment of the panel display device according to the present invention.

In the instant embodiment, the back frame 23 of the panel display device 20 is formed by splicing. As shown in FIG. 6, take the splicing of one end of the first main splicing element

231 and one end of the second main splicing element 232 as an example. The splicing of one end of the first main splicing element 231 to one end of the second main splicing element 232 is, for example, through screw, buckle or soldering to splice one end of the second main splicing element 232 to one end of the first main splicing element 231.

Figure 7:
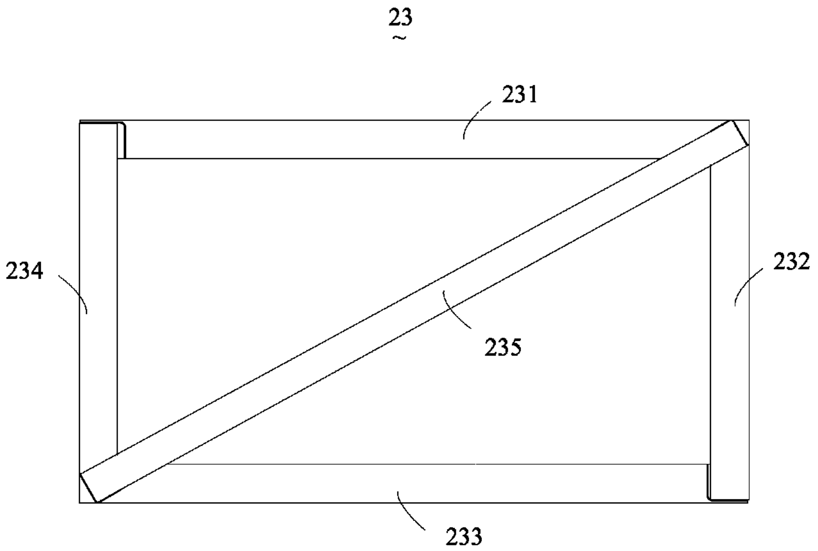
FIG. 7 is a schematic view showing the first auxiliary splicing element disposed diagonally on the main frame of the sixth embodiment of the panel display device according to the present invention.
Figure 8:
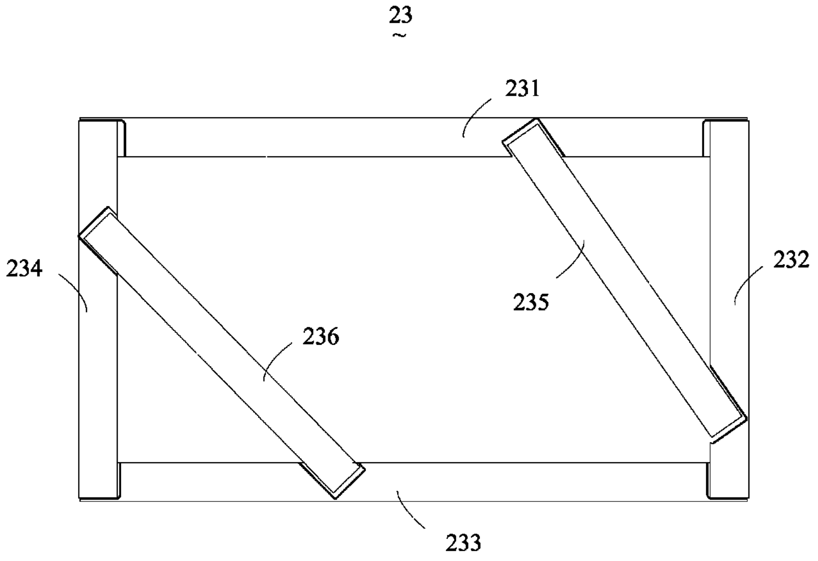
FIG. 8 is a schematic View showing the first auxiliary splicing element and the second auxiliary splicing element on the main frame of the seventh embodiment of the panel display device according to the present invention.

In the instant embodiment, the first auxiliary splicing element 235 and the second auxiliary splicing element 236 are disposed inside the main frame 27 of the back frame 23. One end of the first auxiliary splicing element 235 is spliced to the first main splicing element 231, and the other end of the first auxiliary splicing element 235 is spliced to the third main splicing element 233; one end of the second auxiliary splicing element 236 is spliced to the first main splicing element 231, and the other end of the second auxiliary splicing element 236 is spliced to the third main splicing element 233; and the second main splicing element 232, the fourth main splicing element 234, the first auxiliary splicing element 235 and the second auxiliary splicing element 236 are all disposed in parallel. In other embodiments, at least an auxiliary splicing element is disposed inside the main frame 27, and for example, only the first auxiliary splicing element 235 is disposed inside the main frame 27. In addition, two ends of the first auxiliary splicing element 235 can be spliced to at least two main splicing elements of the first main splicing element 231, the second main splicing element 232, the third main splicing element 233 and fourth main splicing element 234, and for example, the first auxiliary splicing element 235 can be diagonally disposed inside the main frame 27, as shown in FIG. 7. Similarly, two ends of 12 the second auxiliary splicing element 236 can be spliced to at least two main splicing elements of the first main splicing element 231, the second main splicing element 232, the third main splicing element 233 and the fourth main splicing element 234, and for example, two ends of the first auxiliary splicing element 235 are spliced to the adjacent first main splicing element 231 and second main splicing element 232, and two ends of the second auxiliary splicing element 236 are spliced to the adjacent third main splicing element 233 and fourth main splicing element 234, as shown in FIG. 8.

In the instant embodiment, the back frame 23 comprises seven support frames 2371, 2372, 2373, 2374, 2375, 2376, 2377; wherein the support frame 2371 is fastened to the fourth main splicing element 234, the support frames 2372, 2373 are fastened respectively to the first auxiliary splicing element 235, the support frame 2374 is fastened to the second auxiliary splicing element 236, the support frame 2375 is fastened to the second main splicing element 232, and two ends of the support frames 2376, 2377 are fastened respectively to the first auxiliary splicing element 235 and the second auxiliary splicing elements 236. In fact, the support frame can be fastened to one or more of the first main splicing element 231, the second main splicing element 232, the third main splicing element 233, the fourth main splicing element 234, the first auxiliary splicing element 235 and the second auxiliary splicing element 236. In other embodiments, different numbers of support frames can be disposed on the back frame 23. In addition, support frame can be detachably fastened to one or more of the first main splicing element 231, the second main splicing element 232, the third main splicing element 233, the fourth main splicing element 234, the first auxiliary splicing element 235 and the second auxiliary splicing element 236.

A bump (not shown) is disposed on the support frames 2371, 2372, 2373, 2374, 2375, 2376, 2377, and the back frame 23 can fasten components, such as, PCB, through disposed bump.

The following describes corresponding mold for the back frame 23. In the instant embodiment, the first main splicing element 231 and the third main splicing element 233 have the same size and shape, and can be manufacturing by stamping with the same mold. Similarly, the second main splicing element 232, the fourth main splicing element 234, the first auxiliary splicing element 235 and the second auxiliary splicing element 236 have the same size and shape, and can be manufacturing by stamping with the same mold. Therefore, the back frame 23 of the present invention can be manufactured by using two small-size molds in stamping. Compared to the large-size mold in the known technique, the molds for the back frame 23 in the present invention are simpler in structure and smaller in size to reduce the mold cost of the back frame 23. In addition, the back frame 23 of the present invention uses less material than the monolithic back frame 10 so as to further reduce manufacturing cost of the panel display device 20.

Figure 9:
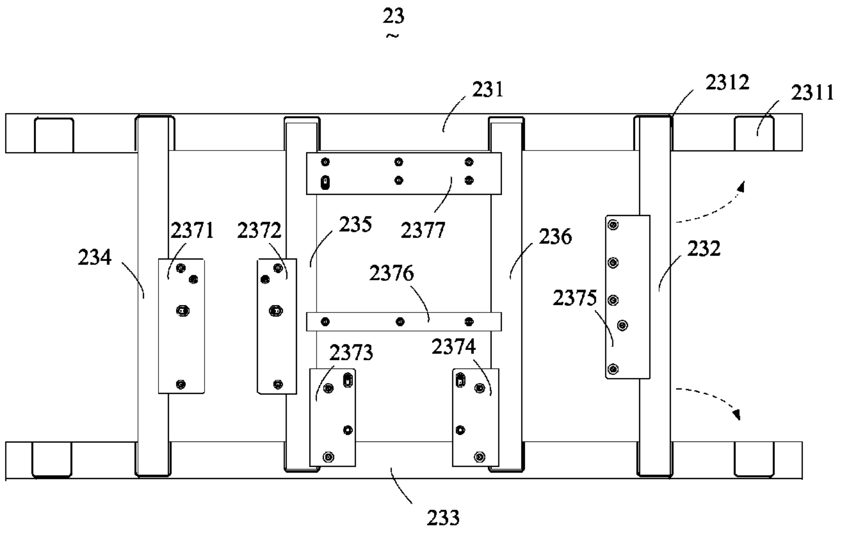
FIG. 9 is a schematic view showing the structure of the splicing part of the back frame of the eighth embodiment of the panel display device according to the present invention.

Referring to FIG. 9, FIG. 9 is a schematic view showing the structure of the splicing part of the back frame of the eighth embodiment of the panel display device according to the present invention. As shown in FIG. 9, in the instant embodiment, one end of the first main splicing element is disposed with two splicing pads, with structure matching one end of the second main splicing element so as to enable splicing of the first main splicing element and one end of the second main splicing element.

Figure 10:
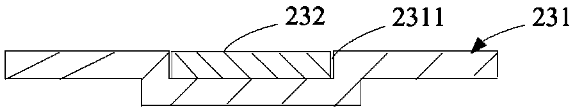
FIG. 10 is cross-sectional view of the first embodiment of the splicing part in FIG. 9.

Specifically, one end of the first main splicing element 231 is disposed with two splicing parts 2311, 2312. The splicing parts 2311, 2312 are laid out along length direction of the first main splicing element 231 with separating space. The splicing parts 2311, 2312 are concave parts disposed on the first main splicing element 231 with shape matching one end of the second main splicing element 232 to accommodate one end of the second main splicing element 232. As shown in FIG. 10, the splicing parts 2311, 2312 are non-through concave parts on opposite sides of one end of the first main splicing element 231, the shape of the concave part is rectangular and the second main splicing element 232 is a long strip.

Figure 11:
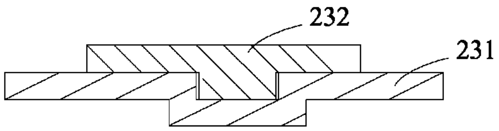
FIG. 11 is a schematic view showing the splicing of the splicing part of the back frame of the ninth embodiment of the panel display device according to the present invention.

When forming a large-size back frame 23, the first step is to select the splicing part 2311 closer to end of the first main splicing element 231, and then select the second main splicing element 232 with corresponding width. Then, one end of the second main splicing element 232 is disposed onto the concave part of the splicing part 2311. Then, one end of the second main splicing element 232 is fastened to the splicing part 2311 by using a screw, a buckle or soldering. When forming a small-size back frame 23, the first step is to select the splicing part 2312 farther from end of the first main splicing element 231, and then select the second main splicing element 232 with corresponding width. Then, one end of the second main splicing element 232 is disposed onto the concave part of the splicing part 2312. Then, one end of the second main splicing element 232 is fastened to the splicing part 2312 by using a screw, a buckle or soldering. Specifically, a convex part is disposed at corresponding location on a surface of the second main splicing element 232, wherein the convex part of the second main splicing element 232 can be placed into corresponding concave part of the first main splicing element 231 to splice the first main splicing element 231 and the second main splicing element 232, as shown in FIG. 11. In addition, one end of the second main splicing element 232 can be disposed with at least two or more convex parts laid out along the length direction of the second main splicing element 232 with separating space, for example, two, three or four convex parts.

Figure 12:
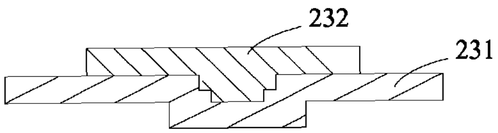
FIG. 12 is a schematic view showing the splicing of the splicing part of the back frame of the tenth embodiment of the panel display device according to the present invention.
Figure 13:
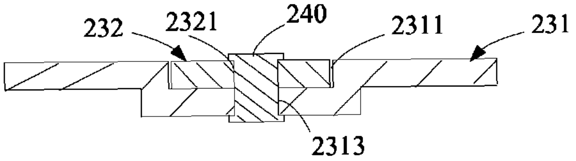
FIG. 13 is a schematic view showing the splicing of the splicing part of the back frame of the eleventh embodiment of the panel display device according to the present invention.

Furthermore, the concave part of the first main splicing element 231 is a concave part with a multi-step structure, and the corresponding convex part is also of a matching multi-step structure, as shown in FIG. 12. In addition, as shown in FIG. 13, take the splicing part 2311 as an example. A bottom of the concave part of the first main splicing element 231 is disposed with a first via hole 2313, and a second via hole 2321 is disposed on the second main splicing element 232 at a location corresponding to the splicing part 2311. The back frame 23 further comprises a fixing element 240, which passes the first via hole 2313 and the second via hole 2321 to splice the first main splicing element 231 and the second main splicing element 232.

Figure 14:
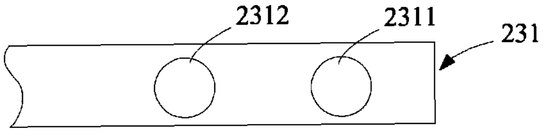
FIG. 14 is a schematic view showing the structure of the splicing part of the back frame of the twelfth embodiment of the panel display device according to the present invention.

FIG. 14 shows another embodiment of the back frame of the panel display device of the present invention. In this embodiment, the concave parts of the splicing parts 2311, 2312 of the first main splicing element 231 are round. However, in other embodiments, the concave parts can also be of other shapes, such as, triangular or polygon.

Figure 15:
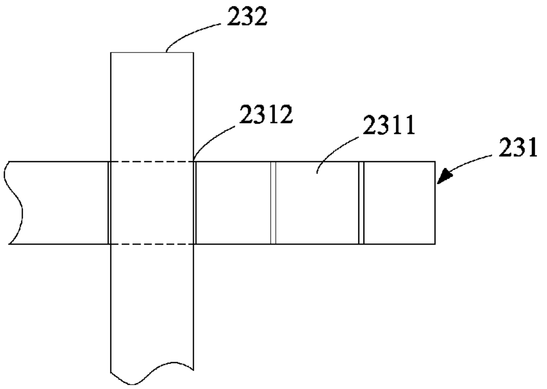
FIG. 15 is a schematic view showing the structure of the splicing part of the back frame of the thirteenth embodiment of the panel display device according to the present invention.
Figure 16:
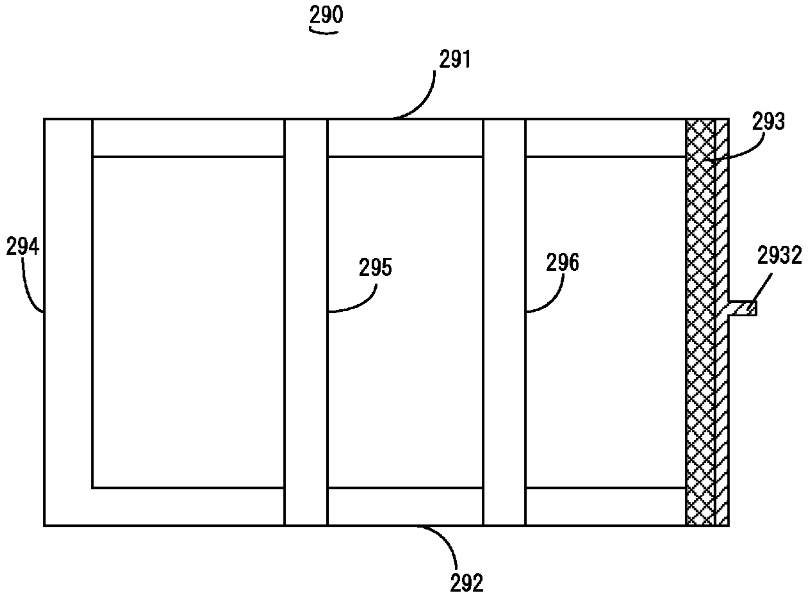
FIG. 16 is a schematic view of the back frame of the fourteenth embodiment of the panel display device according to the present invention.
Figure 17:
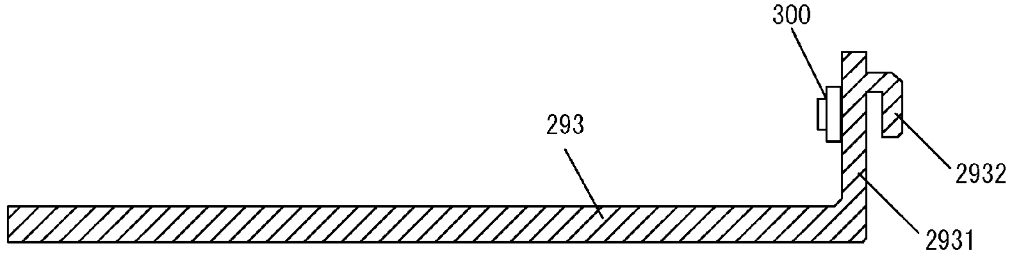
FIG. 17 is a cross-sectional view of the third main splicing element of FIG. 16.
Figure 18:
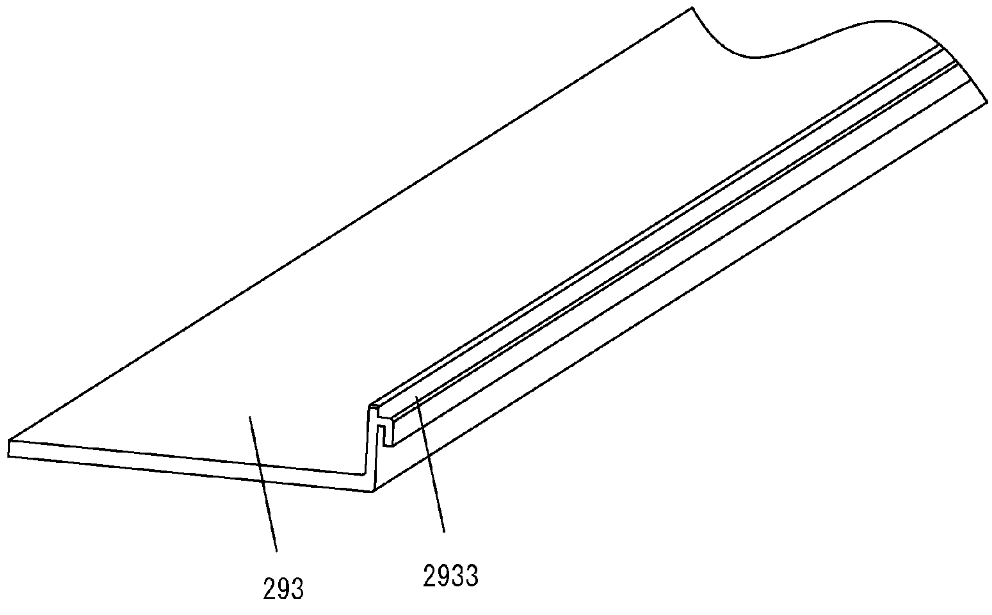
FIG. 18 is a schematic view of the third main splicing element of FIG. 16 disposed with reverse L-shaped for-processing block on side wall.
Figure 19:
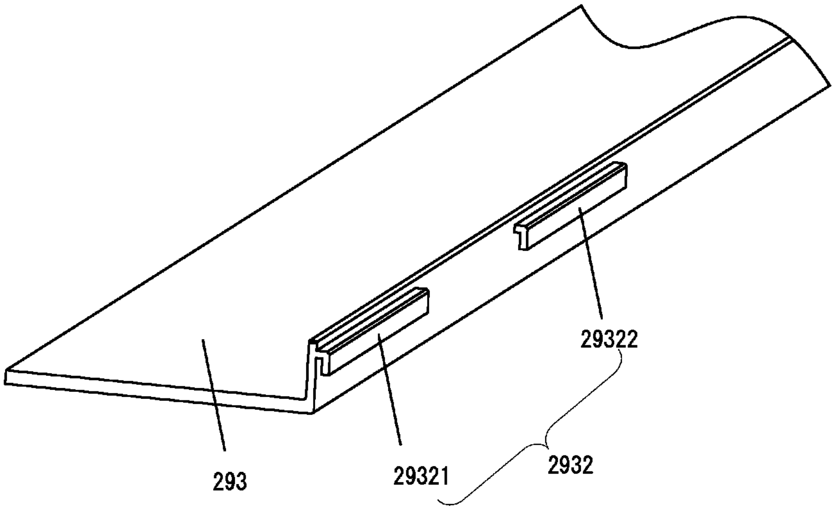
FIG. 19 is a schematic view of the third main splicing element of FIG. 16 with reverse L-shaped for-processing block on side wall milled out to form hook.
Figure 20:
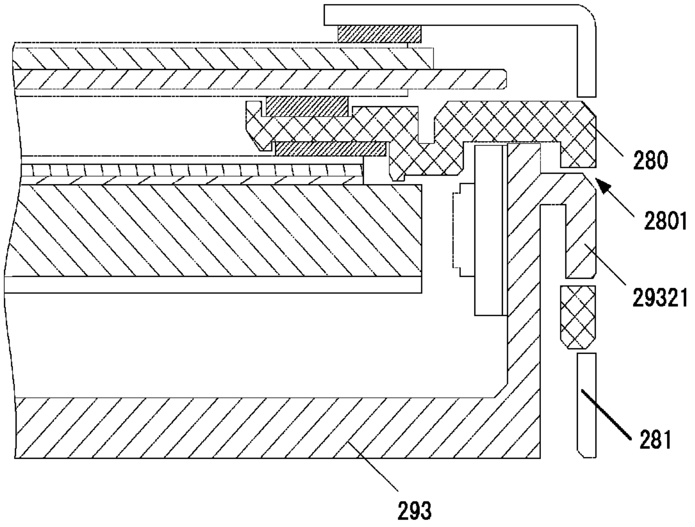
FIG. 20 is a cross-sectional view of the third main splicing element of FIG. 16 fastened to front frame.
Figure 21:
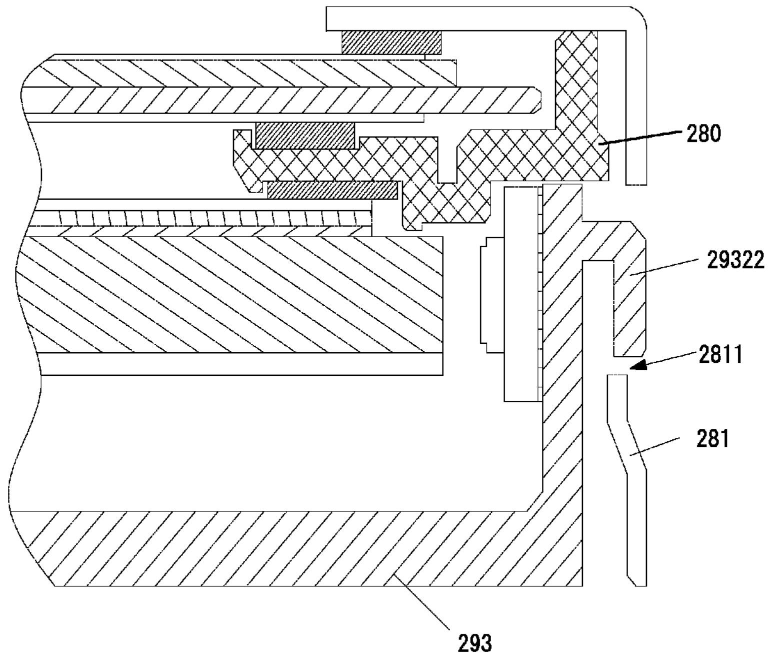
FIG. 21 is a cross-sectional view of the third main splicing element of FIG. 16 fastened to panel.

FIG. 15 shows yet another embodiment of the back frame of the panel display device of the present invention. In this embodiment, the splicing parts 2311, 2312 are concave parts penetrating through opposite sides of the first main splicing element 231 so as to allow one end of the second main splicing element 232 to move on the splicing parts 2311, 2312. For example, one end of the second main splicing element 232 is fixed after penetrating through the splicing part 2312, and the extra penetrating through part is out off to adjust the length of the second main splicing element 232 when used as the main splicing element of the back frame.

In actual application, one end of the first main splicing element 231 and two ends of the third main splicing element 233 are disposed with two splicing parts, with the same structure as the splicing parts 2311, 2312. Two end of the second main splicing element 232 and two ends of the fourth main splicing element 234 can also be disposed with or without respective designs depending on the application condition, for example:

(1) In the first scenario, as shown in FIG. 10, two ends of the second main splicing element 232 and two ends of the fourth main splicing element 234 can be without any design, that is, the end is the same as other parts. At this point, when selecting a different splicing part 2311 (2312) at one end of the first main splicing element 231 (the same for the other end), the corresponding second main splicing element 232 and fourth main splicing element 234 should also adjust the length if the width of the back frame 23 is to vary. That is, if the splicing part 2311 on the first main splicing element 231 is selected for splicing, the second main splicing element 232 and the fourth main splicing element 234 are not cut or only a short portion is cut; if the splicing part 2312 on the first main splicing element 231 is selected for splicing, the second main splicing element 232 and the fourth main splicing element 234 must be cut, and the length to be cut depends on the distance from the splicing part to the one end of the first main splicing element 231.

(2) In the second scenario, as shown in FIG. 11, the scenario is similar to the first scenario, except that the second main splicing element 232 and the fourth main splicing element 234 use a different convex part to match the first main splicing element 231 and the third main splicing element 233 to realize varying the width of the back frame 23. Similarly, when a splicing part other than the splicing part 2311 on the first main splicing element 231 is selected for splicing, the extra part of the second main splicing element 232 and fourth main splicing element 234 must be out before or after splicing.

The above scenarios are also applicable to the main frame 27 of the back frame 23 formed by splicing two L-shape main splicing elements.

In summary, the first main splicing element of the back frame 23 of the present invention is disposed with at least two splicing parts. The number of splicing parts depends on the actual needs. The instant embodiment uses two splicing parts 2311, 2312 for description. When designing molds for the back frame 23, only two molds are required. That is, a mold for the first main splicing element and a mold for the second main splicing element. The first main splicing element is disposed with a plurality of splicing parts for different sizes of the back frame 23. When the splicing back frame 23, the corresponding splicing part is selected based on the required size of the back frame 23. By splicing the second main splicing element onto the first main splicing element and cutting off extra part of the first main splicing element extending beyond the second main splicing part, a required size of the back frame 23 can be obtained. Compared to the known technique which requires different back frame molds for different sizes of the back frame 10, the back frame 23 of the panel display device of the present invention only needs a mold for the first main splicing element and a mold for the second main splicing element to realize the sharing of molds among different sizes of the back frame. Also, as the molds are simple in structure, the mold cost is reduced.

Refer to FIGS. 16-21. The following uses four main splicing elements and two auxiliary splicing elements as an example to describe the embodiment wherein when the main splicing elements of the back frame 23 of the panel display device 20 are disposed with the light source, the selection of material for the main splicing elements and other main splicing elements without the light source and the manufacturing of the hook of the main splicing elements.

The first main splicing element 291, the second main splicing element 292, the third main splicing element 293, the fourth main splicing element 294, the first auxiliary splicing element 295 and the second auxiliary splicing element 296 form the back frame 290. The light source 300 can be disposed on at least one of the first main splicing element 291 the second main splicing element 292, the third main splicing element 293 and the fourth main splicing element 294. The main splicing element with the light source 300 has a first heat-dissipation capability, and the remaining main splicing elements without the light source 300 have a second heat-dissipation capability. The first heat-dissipation capability is better than the second heat-dissipation capability. For example, the main splicing element with the light source 300 can be made of aluminum extrusion. When the material for the main splicing element with the light source 300 is aluminum extrusion, the downward hook on the aluminum extrusion for the main splicing element with the light source 300 can be milled out by reverse L-shape aluminum extrusion.

The following description is based on using the third main splicing element 293 for disposing the light source 309. The light source 300 is disposed on a surface of the side wall 2931 bended upward from the third main splicing element 293. The other surface of the side wall 2931 of the third main splicing element 293 away from the light source is disposed with the hook 2932. The third main splicing element 293 has a first heat-dissipation capability, and the first main splicing element 291, the second main splicing element 292 and the fourth main splicing element 294 away from the light source 300 have a second heat-dissipation capability. The first heat-dissipation capability is better than the second heat-dissipation capability. In the instant embodiment, the material for the third main splicing element 293 with the light source 300 is preferably aluminum extrusion, which has a better heat-dissipation capability to dissipate heat. The material for the remaining first main splicing element 291, second main splicing element 292 and fourth main splicing element 294 can be galvanized steel. When the material for the third main splicing element 293 with the light source 300 is aluminum extrusion, the aluminum extrusion cannot be made to form the hook 2932 on the third main splicing element 2932 through stamping. Therefore, the aluminum extrusion material is made through extrusion process to form the third main splicing element 293 for the light source 300; wherein the third main splicing element 293 comprises the side wall 2931 bended upward and a reverse L-shape for-processing block 2933 formed by extending from the other surface away from the light source 300. By milling out an inner side near the lower end of the reverse L-shaped for-processing block 2933, the hook 2932 can be formed. There are two hooks 2392, that is, the first hook 23921 and the second hook 29322. The first hook 29321 is for matching an engaging structure 2801 of the front frame 280 so as to fasten the front frame 280 to the back frame 290. The second hook 20322 is for matching an engaging structure 2811 of the panel 281 so as to fasten the panel 281 to the back frame 290.

In the instant embodiment, through disposing at least two main splicing elements, the back frame splices the at least two main splicing elements to simplify the structure for back frame molds to reduce back frame mold cost as well as save material for the back frame to reduce manufacturing cost of the panel display device. In addition, because of the skeleton structure of the back frame and the use of a heat-dissipating material for the main splicing element disposed with the light source, the present invention is good for heat-dissipation. The other surface of the side wall of the main splicing element away from the light source is disposed with the hook to engage and fasten the front frame and the panel for easy assembly of the front frame and the panel.

The present invention further provides a manufacturing method embodying back frame molds of the panel display device of the present invention. The back frame mold is disposed with main pattern for forming the main splicing elements. The main pattern is disposed with a sub-pattern for forming at least two splicing parts at one end of the main splicing element; wherein the main splicing element includes the first main splicing element and the second main splicing element to correspond to the main pattern. The splicing part is the first splicing part on the first main splicing element to correspond to the sub-pattern.

Figure 22:
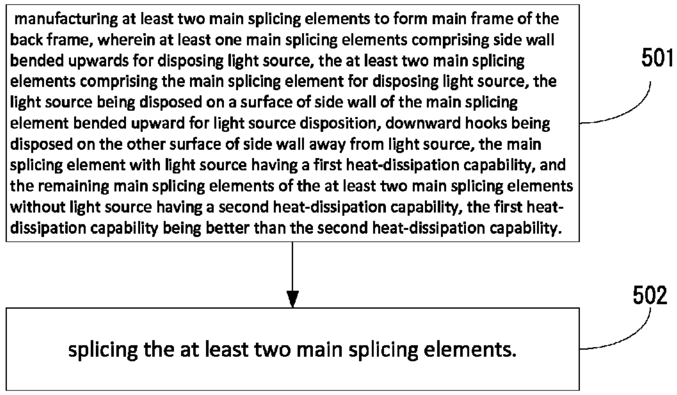
FIG. 22 is a flowchart of a manufacturing method for the back frame of the fourteenth embodiment of the panel display device according to the present invention.
Figure 23:
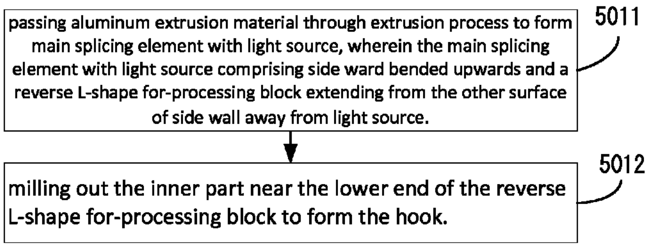
FIG. 23 is a flowchart of a manufacturing method for the hook of the main splicing element for light disposition in FIG. 22.

As shown in FIG. 22, the present invention further provides a manufacturing method for back frame of the panel display device of the present invention, which comprises the following steps.

Step 501: manufacturing at least two main splicing elements to form a main frame of the back frame, wherein at least one main splicing element comprising a side wall bended upwards for disposing the light source, the at least two main splicing elements comprising the main splicing element for disposing the light source, the light source being disposed on a surface of the side wall of the main splicing element bended upward for the light source disposition, downward hooks being disposed on the other surface of the side wall away from the light source, the main splicing element with the light source having a first heat-dissipation capability, and the remaining main splicing elements of the at least two main splicing elements without the light source having a second heat-dissipation capability, the first heat-dissipation capability being better than the second heat-dissipation capability.

In the instant embodiment, the material for the main splicing element with the light source can be aluminum extrusion, and the material for the remaining main splicing elements of the at least two main splicing elements without the light source can be galvanized steel. When the material for the main splicing element with the light source is aluminum extrusion, the aluminum extrusion cannot be made to form hooks on the other surface of the side wall away from the light source on the main splicing element through stamping.

Referring to sub-steps 5011, 5012, sub-steps 5011, 5012 describes the detailed manufacturing method for hooks on the main splicing element when the material for the main splicing element with the light source is aluminum extrusion. Referring to FIGS. 17-21, the manufacturing method for hooks on the main splicing element with the light source comprises specifically the following.

Sub-step 5011: passing aluminum extrusion material through extrusion process to form the main splicing element with the light source, wherein the main splicing element with the light source comprising side wall bended upwards and a reverse L-shape for-processing block extending from the other surface of the side wall away from the light source.

Sub-step 5012: milling out the inner part near the lower end of the reverse L-shape for-processing block to form the hook.

In the instant embodiment, there are two hooks that is, a first hook and a second hook, wherein the first hook is for matching an engaging structure of the front frame to fasten the front frame to the back frame, and the second hook is for matching an engaging structure of the panel to fasten the panel to the back frame.

Step 502: splicing the at least two main splicing elements.

In the instant embodiment, the splicing structure of the back frame is the same as the splicing structure of the back frame in the aforementioned embodiments, and the description is omitted here.

The manufacturing method for back frame and backlight system of the present invention, through disposing at least two main splicing elements, splices the at least two main splicing elements to simplify the structure for back frame molds to reduce back frame mold cost as well as save material for back frame to reduce manufacturing cost of panel display device. In addition, because of the use of heat-dissipating material for main splicing element disposed with light source, the present invention is good for heat-dissipation. The other surface of side wall of main splicing element away from light source is disposed with hook to engage and fasten the front frame and the panel for easy assembly of front frame and panel.

In the instant embodiment, when other splicing parts existing between the splicing location of the second main splicing element and the adjacent and of the first main splicing element, the extra part is cut off based on the size of the back frame before or after the splicing. The detailed description is omitted here.

Figure 24:
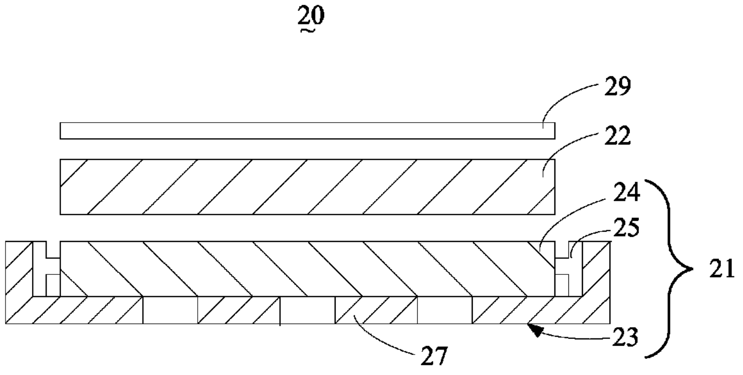
FIG. 24 is a schematic view of the structure of the fifteenth embodiment of the panel display device with touch panel according to the present invention.

As shown in FIG. 24, the panel display device 20 of the present invention further comprises a touch panel 29, and the touch panel 29 is disposed on 21 the light-emitting side of the display panel 22 of the panel display device 20, wherein the panel display device 20 comprises: a backlight system 21 and the above display panel 22. The backlight system is disposed on the back side of the display panel 22 and provides the light source to the display panel 22.

The backlight system 21 further comprises: a light source 25, a light uniformizing mechanism 24 and a back frame 23; the back frame 23 carrying the light source 25 and the light uniformizing mechanism 24. When backlight system 21 is edge-lit, the light-uniformizing mechanism 23 is a light-guiding plate; when the backlight system 21 is direct-lit, the light-uniformizing mechanism 23 is a diffuser. The back frame 23 comprises at least the first main splicing element and the second main splicing element. The at least first main splicing element and second main splicing element form the main frame 27 of the back frame 23.

Backlight system 21 can also be any of the aforementioned backlight systems.

It should be noted that the panel display device 20 of the present invention can be a liquid crystal display device or a liquid crystal TV.

Figure 25:
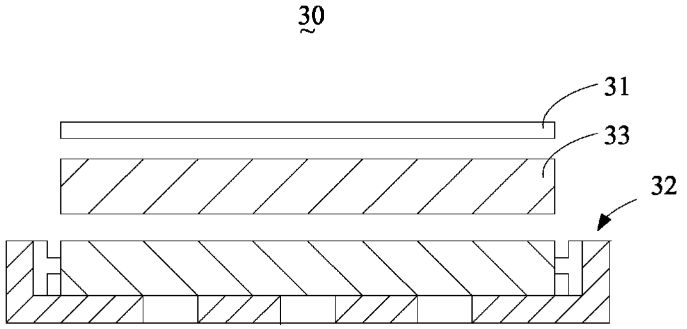
FIG. 25 is a schematic view of the structure of the sixteenth embodiment of the 3D display device according to the present invention

The present invention also provides a 3D display device 30. As shown in FIG. 25, the 3D display device 30 comprises a liquid crystal lens grating 31, a backlight system 32 and a display panel 33; wherein the liquid crystal lens grating 31 is disposed on the light-emitting side of the display panel 33. The backlight system 32 is any of the aforementioned backlight system, such as, the backlight system 32 comprising a back frame 23, wherein the back frame 23 comprising at least the first main splicing element and the second main splicing element forming the main frame of the back frame. The detailed description is omitted here.

Figure 26:
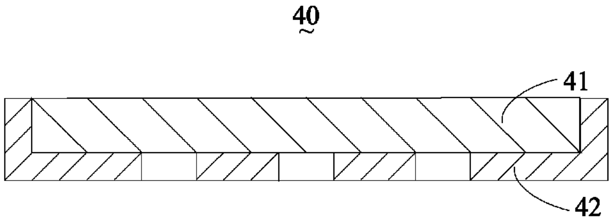
FIG. 26 is a schematic view of the structure of the seventeenth embodiment of the plasma display device according to the present invention.

The present invention also provides a plasma display device 40. As shown in FIG. 26, the plasma display device 40 comprises a plasma display panel 41 and a back frame 42. The back frame 42 is disposed at the back side of the plasma display panel 41, wherein the back frame 42 can be any of the aforementioned back frames. The detailed description is omitted here.

As such, the panel display device, the 3D display device and the plasma display device of the present invention use the back frame molds having simple structure to reduce the cost for the back frame mold as well as save back frame material to further reduce the cost for the panel display device.

Figure 27:
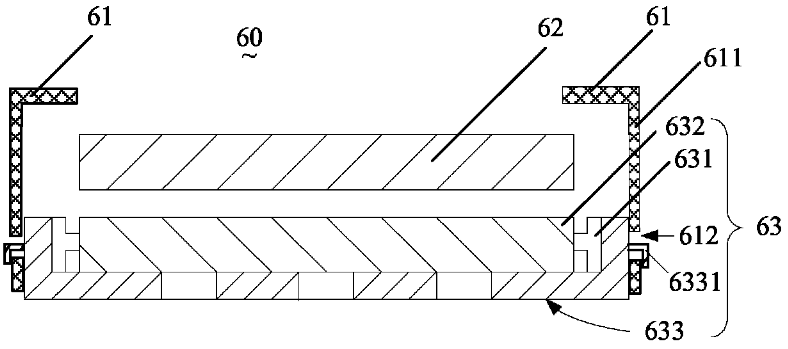
FIG. 27 is a schematic view of the structure of the eighteenth embodiment of the panel display device according to the present invention.

The present invention also provides an embodiment of the panel display device of the present invention. As shown in FIG. 27, a panel display device 60 comprises a front frame 61, a back frame 62 and a backlight system 63. The backlight system 63 comprises a light source 631, a light uniformizing mechanism 632 and a back frame 633. The back frame 633 carries the light source 631 and the light uniformizing mechanism 632. The panel 62 is sandwiched between the front frame 61 and the back frame 633. The front frame 61 is disposed with a side wall 611 extending downward. The side wall 611 of the front frame 61 is disposed with a window 612 matching a hook 6331 of the back frame 633. The hook 6331 of the back frame 633 passes through the window 612 of the side wall 611 of the front frame 61 to engage and fasten the front frame 611, wherein the splicing structure of the back frame is the same as the splicing structure of the back frame in aforementioned embodiments and detailed description is omitted here.

In the embodiments of the present invention, the back frame formed by splicing can simplify the mold for back frame to reduce the cost as well as save material for back frame to reduce manufacturing cost for the panel display device. The back frame has the hook to match the window on the side wall of the front frame so that the hook of the back frame passes through the window on the side wall of the front frame to engage and fasten the front frame for easy assembling of the front frame.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A manufacturing method for a back frame of a panel display device, which comprises:

manufacturing at least a first main splicing element and a second main splicing element, a surface on one end of the first main splicing element being disposed with two splicing parts laid out along a length direction of the first main splicing element with a separating space, and the splicing parts of the first main splicing element matching one end of the second main splicing element; wherein at least one of the first or the second main splicing elements being disposed with a light source and the material for the main splicing element disposed with the light source being aluminum extrusion; wherein the main splicing element made of aluminum extrusion comprising a side wall bent upward and a reverse L-shaped for-processing block formed by extending from another surface of the side wall away from the light source, milling off an inner part of the reverse L-shaped for-processing block near lower end to form the main splicing element having a hook to be disposed with the light source, the light source being disposed on a surface of the side wall bent upward for light source disposition, one or more remaining main splicing elements not for disposing light source being made of galvanized steel; and the first main splicing element splicing with the second main splicing element through the splicing parts to form a main frame of the back frame.

2. The manufacturing method as claimed in claim 1, characterized in that:

a first hook is formed and the first hook matches an engaging structure of a front frame so as to fasten the front frame to the back frame, and a second hook is formed and the second hook matches an engaging structure of a panel so as to fasten the panel to the back frame.

3. A back frame of a panel display device, which comprises:

at least two main splicing elements, forming a main frame of the back frame; wherein one of the at least two main splicing elements is bent upward for disposing with a light source; wherein the light source being disposed on a surface of a side wall of the main splicing element that is bent upward for light source disposition; at least a downward hook being disposed on the other surface of the side wall away from the light source, the main splicing element for disposing light source having a first heat-dissipation capability; the remaining main splicing elements of the at least two main splicing elements not for disposing with the light source having a second heat-dissipation capability; and the first heat-dissipation capability being greater than the second heat-dissipation capability;

the at least two main splicing elements comprising first main splicing element and a second main splicing element, spliced together; wherein a surface on one end of the first main splicing element is being disposed with two splicing parts laid out along a length direction of the first main splicing element with a separating space, and the first main splicing element splicing with the second main splicing element through the slicing parts to form the main frame of the back frame of different sizes.

4. The back frame as claimed in claim 3, characterized in that:

the splicing part is a concave part disposed on the surface of the first main splicing element, the surface on one end of the second main splicing element is disposed with at least two convex parts laid out along a length direction of the second main splicing element with a separating space; the convex part inserts into the concave part to splice the first main splicing element with the second main splicing element.

5. The back frame as claimed in claim 4, characterized in that:

a bottom of the concave part of the first main splicing element is disposed with a first via hole, a corresponding location on the second main splicing element is disposed with a second via hole, the back frame comprises a fixing element, and the fixing element passes through the first via hole and the second via hole to splice the first main splicing element with the second main splicing element.

6. The back frame as claimed in claim 5, characterized in that:

the back frame comprises a third main splicing element and a fourth main splicing element; the first main splicing element, the second main splicing element, the third main splicing element and the fourth main splicing element all have a long strip shape, and are spliced in a head-to-tail manner to form the main frame of the back frame.

7. The back frame as claimed in claim 6, characterized in that:

the back frame comprises auxiliary splicing elements disposed inside the main frame, and the auxiliary splicing elements are spliced with the main splicing elements.

8. The back frame as claimed in claim 7, characterized in that:

the auxiliary splicing elements comprise a first auxiliary splicing element and a second auxiliary splicing element; two ends of the first auxiliary splicing element are spliced with at least two of the first main splicing element, the second main splicing element, the third main splicing element and the fourth main splicing element; and two ends of the second auxiliary splicing element are spliced with at least two of the first main splicing element, the second main splicing element, the third main splicing element and the fourth main splicing element.

9. The back frame as claimed in claim 7, characterized in that:

two ends of a first auxiliary splicing element are spliced with the adjacently disposed first main splicing element and second main splicing element, and two ends of a second auxiliary splicing element are spliced with the adjacently disposed third main splicing element and fourth main splicing element; or, two ends of the first auxiliary splicing element are spliced with the adjacently disposed third main splicing element and fourth main splicing element, and two ends of the second auxiliary splicing element are spliced with the adjacently disposed first main splicing element and second main splicing element.

10. The back frame as claimed in claim 7, characterized in that:

the second main splicing element, the fourth main splicing element, a first auxiliary splicing element and a second auxiliary splicing element and the second auxiliary splicing element are disposed in parallel.

11. The back frame as claimed in claim 7, characterized in that:

the back frame comprises at least a support frame, detachably fixed to one or more of the first main splicing element, the second main splicing element, the third main splicing element, the fourth main splicing element, a first auxiliary splicing element and a second auxiliary splicing element.

* * * * *